(12) United States Patent
Bernabeu

(10) Patent No.: US 9,582,955 B2
(45) Date of Patent: Feb. 28, 2017

(54) METHOD AND TOKEN FOR MANAGING ONE PROCESSING RELATING TO AN APPLICATION SUPPORTED OR TO BE SUPPORTED BY A TOKEN

(75) Inventor: Gil Bernabeu, Gemenos (FR)

(73) Assignee: GEMALTO SA, Meudon (FR)

(*) Notice: Subject to any disclaimer, the term of this patent is extended or adjusted under 35 U.S.C. 154(b) by 196 days.

(21) Appl. No.: 13/139,619

(22) PCT Filed: Nov. 24, 2009

(86) PCT No.: PCT/EP2009/065709
§ 371 (c)(1),
(2), (4) Date: Aug. 12, 2011

(87) PCT Pub. No.: WO2010/069717
PCT Pub. Date: Jun. 24, 2010

(65) Prior Publication Data
US 2011/0296521 A1    Dec. 1, 2011

(30) Foreign Application Priority Data

Dec. 17, 2008  (EP) .................................. 08305962

(51) Int. Cl.
*G06F 21/00* (2013.01)
*G07F 7/10* (2006.01)
*G06Q 20/34* (2012.01)
*H04W 4/00* (2009.01)

(52) U.S. Cl.
CPC ......... *G07F 7/1008* (2013.01); *G06Q 20/341* (2013.01); *G06Q 20/3552* (2013.01); *G06Q 20/35765* (2013.01); *H04W 4/003* (2013.01)

(58) Field of Classification Search
CPC ..................................................... G07F 7/1008
USPC ........................................................... 726/19
See application file for complete search history.

(56) References Cited

U.S. PATENT DOCUMENTS 4,802,218 A * 1/1989 Wright et al. .................. 705/60
4,864,618 A * 9/1989 Wright et al. .................. 380/51
4,900,903 A * 2/1990 Wright et al. ................ 235/380

(Continued)

OTHER PUBLICATIONS

*International Search Report (PCT/ISA/210) issued on Apr. 9, 2010, by European Patent Office as the International Searching Authority for International Application No. PCT/EP2009/065709.

(Continued)

*Primary Examiner* — Mahfuzur Rahman
(74) *Attorney, Agent, or Firm* — Buchanan Ingersoll & Rooney PC

(57) ABSTRACT

The invention relates to a method 30 for managing at least one processing relating to an application supported or to be supported by a token. The token comprises means for processing data, means for storing data and means for communicating with outside.
According to the invention, the method comprises steps in which at least one token user is required to give or not to give her/his authorization 38 before executing the at least one processing relating to an application supported or to be supported by the token; and the token verifies 316 whether the at least one token user gives or does not give her/his authorization.
The invention relates also to a corresponding token likely to cooperate with a terminal.

13 Claims, 2 Drawing Sheets

(56) References Cited

U.S. PATENT DOCUMENTS

| | | | | |
|---|---|---|---|---|
| 4,900,904 | A * | 2/1990 | Wright | G06K 7/0034 235/380 |
| 5,533,123 | A * | 7/1996 | Force et al. | 713/189 |
| 6,212,635 | B1 * | 4/2001 | Reardon | 713/165 |
| 6,694,436 | B1 * | 2/2004 | Audebert | 726/9 |
| 6,799,155 | B1 * | 9/2004 | Lindemann | H04W 8/183 455/558 |
| 6,813,682 | B2 * | 11/2004 | Bress et al. | 711/112 |
| 6,915,124 | B1 * | 7/2005 | Kiessling et al. | 455/411 |
| 7,085,935 | B1 * | 8/2006 | Ellison et al. | 726/2 |
| 7,272,385 | B2 * | 9/2007 | Mirouze et al. | 455/414.1 |
| 7,353,044 | B2 * | 4/2008 | Nachef | H04L 67/10 455/419 |
| 7,481,373 | B2 * | 1/2009 | Cricco | H04W 8/245 235/375 |
| 7,496,193 | B2 * | 2/2009 | Nachef | G06F 8/60 379/357.01 |
| 8,078,885 | B2 * | 12/2011 | Jobmann | 713/186 |
| 8,332,637 | B2 * | 12/2012 | Relyea | 713/166 |
| 8,478,339 | B2 * | 7/2013 | Bradley | H04L 43/50 455/558 |
| 8,504,105 | B2 * | 8/2013 | Baldischweiler | G06F 3/0617 455/41.1 |
| 8,819,297 | B2 * | 8/2014 | Ennesser | G06F 13/102 710/5 |
| 2004/0023664 | A1 * | 2/2004 | Mirouze et al. | 455/456.1 |
| 2004/0157584 | A1 * | 8/2004 | Bensimon | H04L 63/0853 455/411 |
| 2006/0106836 | A1 * | 5/2006 | Masugi et al. | 707/101 |
| 2006/0113379 | A1 * | 6/2006 | Cricco | H04W 8/245 235/380 |
| 2006/0278694 | A1 * | 12/2006 | Jha et al. | 235/379 |
| 2008/0121687 | A1 * | 5/2008 | Buhot | G06Q 20/32 235/375 |
| 2008/0280644 | A1 * | 11/2008 | Hugot | H04L 63/0853 455/556.2 |
| 2009/0164322 | A1 * | 6/2009 | Khan et al. | 705/14 |
| 2009/0215490 | A1 * | 8/2009 | Lee | G06K 19/0701 455/558 |
| 2009/0270130 | A1 * | 10/2009 | Lee | H04W 12/06 455/558 |
| 2010/0063906 | A1 * | 3/2010 | Nelsen et al. | 705/30 |
| 2010/0090000 | A1 * | 4/2010 | Varone | H04W 92/08 235/382 |
| 2010/0235882 | A1 * | 9/2010 | Moore | 726/3 |
| 2011/0126002 | A1 * | 5/2011 | Fu et al. | 713/156 |
| 2011/0191822 | A1 * | 8/2011 | Pinsky et al. | 726/3 |
| 2011/0224509 | A1 * | 9/2011 | Fish et al. | 600/301 |
| 2011/0296182 | A1 * | 12/2011 | Jia et al. | 713/168 |
| 2012/0066757 | A1 * | 3/2012 | Vysogorets et al. | 726/9 |
| 2012/0233705 | A1 * | 9/2012 | Boysen et al. | 726/29 |

OTHER PUBLICATIONS

*ETSI TS 101 267 V8.18.0 (Jun. 2007) Digital cellular telecommunications system (Phase 2+); Specification fo the SIM Application Toolkit (SAT) for the Subscriber Identity Module—Mobile Equipment (SIM-ME) interface (3GPP TS 11.14 version 8.18.0 Release 1999).
*ETSI TS 101 181 V8.9.0 (Jun. 2005) Digital cellular telecommunications system (Phase 2+); Security mechanisms for SIM application toolkit; Stage 2 (3GPP TS 03.48 version 8.9.0 Release 1999).
*GlobalPlatform Card Specification Version 2,2, Mar. 2006.

* cited by examiner

METHOD AND TOKEN FOR MANAGING ONE PROCESSING RELATING TO AN APPLICATION SUPPORTED OR TO BE SUPPORTED BY A TOKEN

FIELD OF THE INVENTION

The invention relates, in a general manner, to a method for managing at least one processing relating to an application supported or to be supported by a token.

Moreover, the invention relates to a token for managing at least one processing relating to an application supported or to be supported by the token.

Within the present description, a token is any portable smart object that is intended to communicate with the outside world.

STATE OF THE ART

As known per se, a SIM (acronym for "Subscriber Identity Module") card, as token, supporting a SIM application is allowed by an associated Mobile Network Operator (or MNO), so that a card user may use a cellular telecommunication network of the MNO. The MNO controls a management of the SIM card. In other words, the MNO has the rights for managing the SIM card, i.e. the MNO is the sole entity for allowing any update of the SIM card at and after the issuance of the SIM card.

Likewise, as known per se, a bank card, as token, supporting a bank application is allowed by an associated bank operator (or company), so that a card user may use a bank network to perform a transaction, such as a debit from a bank account owned by the card user. The bank operator controls a management of the bank card. In other words, the bank operator has the rights for managing the bank card, i.e. the bank operator is the sole entity for allowing any update of the bank card at and after the issuance of the bank card.

However, such a known solution has a major disadvantage.

As a matter of fact, presently, when the smart card is manufactured, it is mandatory to know the application issuer, as owner of the application to be loaded into the smart card.

It is therefore complicated and it requires laborious logistics to allow, for one and the same smart card owned by a card user, to support, once issued (which was not loaded with one application before an issuance of the smart card), one application, such as a bank application, issued by one application issuer, such as a bank operator or a MNO.

SUMMARY OF THE INVENTION

The invention eliminates such a major disadvantage by providing a method for managing at least one processing relating to an application supported or to be supported by a token. The token comprises means for processing data, means for storing data and means for communicating with outside.

According to the invention, the method comprises the following steps. At least one token user is required to give or not to give her/his authorization before executing the at least one processing relating to an application supported or to be supported by the token; and the token verifies whether the at least one token user gives or does not give her/his authorization.

The principle of the invention consists in that a token user is involved to control one or several processing(s) specific to an application and the token executes the processing only when the token user has given her/his corresponding approval.

Consequently, contrary to the aforementioned known solution, the proposed solution allows a token user to play a role of a token issuer that controls a management of the considered application.

In other words, the token user that desires to execute one processing of an application supported or to be supported by the token, the token user addresses herself/himself to authorize or not the execution of the desired processing.

The proposed solution allows to ease a management of an application supported or to be supported by the token with respect to the known solution.

Thus, after the issuance of the token, when a token user desires to use the same token, as medium of one application originating from another application issuer, the token user is the sole controller to transfer, i.e. load or download, a desired other application.

Accordingly, it is therefore simpler than with the known solution to import (from outside the token) another application possibly originating from another application issuer by soliciting the token user.

Thus, the management of one processing relating to one application to be supported by the proposed solution involving only a token user, as a controller, is quicker and cheaper than with the known solution requiring, at the issuance, an involvement of the application issuer relating to the desired application to be also supported.

Furthermore, the management of one processing relating to one application to be supported by the proposed solution involving only a token user, as a controller, is quicker and cheaper than with the known solution requiring an involvement of the token issuer or the application issuer of the application that is already supported, i.e. has been already loaded into the token.

According to a further aspect, the invention is a token for managing at least one processing relating to an application supported or to be supported by a token. The token comprises means for processing data, means for storing data and means for communicating with outside.

According to the invention, the token is adapted to require to at least one token user to give or not to give her/his authorization before executing the at least one processing relating to an application supported or to be supported by the token, and to verify whether the at least one token user gives or does not give her/his authorization.

Thus, the invention token is user friendly, since the token user, as the owner of the token, is the controller or manager of her/his token. Thus, the token user may manage her/his token as she/he desires, such as notably create a secure memory area dedicated to any application supported or to be supported by the token, load, install, execute, modify, and/or delete any application supported or to be supported by the token.

It is to be noted that, as token, it can be any electronic device comprising at least one microprocessor or one logic circuit system, at least one memory or being connected to one external memory, and at least one Input/Output communication interface. The token can constitute any electronic support that may have different form factors. For example, it can be embodied within a dongle of the USB (acronym for "Universal Serial Bus") type, a smart card or a chip to be removably linked or soldered to a host device or termed hereinafter terminal.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings.

DETAILED DESCRIPTION

Herein under is considered a case in which the invention method for managing at least one processing relating to an application supported or to be supported by a token is implemented by a SIM type smart card, as token, in cooperation with a mobile phone, as terminal, through an interface of which, a card user is involved to give or not her/his authorization before executing a corresponding processing.

For example, instead of being constituted by a SIM type smart card, the token can be constituted by a dongle of the USB type (that does not need any specific reader within a host computer), a smart card, a MMC (acronym for "MultiMediaCard") card, a SD (acronym for "Secure Digital") Card, and/or any other electronic medium that may have different form factors. According to still other examples, the token can also be a chip fixed, possibly in a removable manner, to a host device, or an embedded Secure Element, as a chip to be soldered within a host device, as terminal.

Likewise, instead of being constituted by a mobile phone, the terminal can be constituted, for example, by a set-up box, a desktop computer, a laptop computer, a media-player, a game console, a handset and/or a Personal Digital Assistant (or PDA).

However, it is only for exemplifying purposes and is not considered to reduce the scope of the present invention.

According to another embodiment (not represented), a sole terminal, i.e. without any cooperation of a token, is adapted to require to at least one terminal user to give or not her/his authorization before executing one processing relating to an application supported or to be supported by the terminal and to verify whether the terminal user gives or does not give her/his authorization. In such an embodiment, it assumes that the terminal is provided with or connected to at least one interface for communicating with a terminal user, such as one display screen, one keyboard, one microphone, and/or one loudspeaker.

According to another embodiment (not represented), a sole token, i.e. without any cooperation of a terminal, is adapted to require to at least one token user to give or not her/his authorization before executing one processing relating to an application supported or to be supported by the token and to verify whether the token user gives or does not give her/his authorization. In such an embodiment, it assumes that the token is provided with or connected to at least one interface for communicating with a token user, such as one display screen, one keyboard, one microphone, and/or one loudspeaker.

Figure 1:
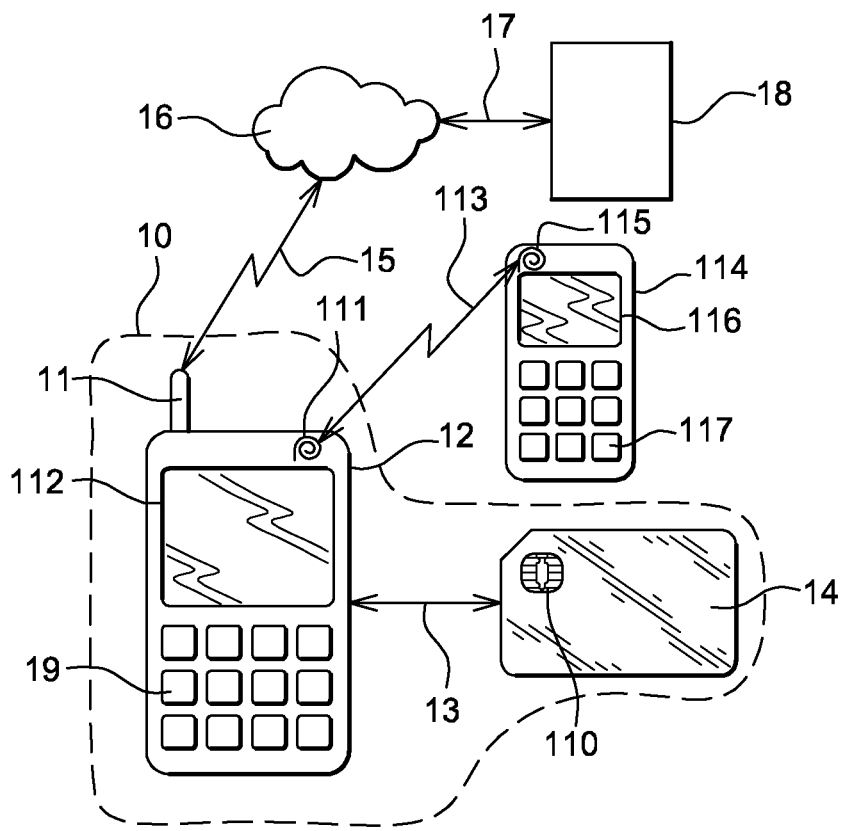
FIG. 1 illustrates a simplified diagram of an embodiment of a system comprising a smart card and a mobile telephone, the system being adapted to manage at least one processing relating to an application supported or to be supported by the smart card according to the invention.

FIG. 1 shows an electronic system 10 that can be connected to a mobile network server 18 and/or to an electronic payment terminal 114.

The system 10 comprises a mobile telephone 12, as a user device, and a SIM type smart card 14 that is coupled to the mobile telephone 12, in order to cooperate with each other.

For the sake of simplicity, the mobile telephone 12 and the SIM type smart card 14 are termed hereinafter respectively the phone 12 and the card 14.

The phone 12 includes, as data processing means, at least one microprocessor, volatile and non-volatile memories, at least three Input/Output (or I/O) interfaces linked together through a data and control bus (not shown).

The microprocessor processes and controls data within the phone 12 and/or data to be exchanged with outside of the phone 12. The microprocessor controls and communicates with all the components of the phone 12, such as the I/O interfaces.

The memories store data relating to an Operating System and applications, among which there is a web browser that allows a user to navigate between different displayed messages, for example through HyperText Markup Language (or HTML) pages.

Each HTML page relates to a message originating from outside the phone 12, namely from the card 14, the mobile network server 18, the electronic payment terminal 114, or through the electronic payment terminal (from a bank server connected to the electronic payment terminal). The message is thus displayed, through the HTML page, to the phone user.

The I/O interfaces comprise a contact interface (not represented) of the type ISO (acronym for <<International Standard Organization>>) 7816, as one I/O interface, to interact with the card 14. The contact interface is intended to let communicate, through a bi-directional link 13, with the card 14. The contact interface contains one contact pad used for implementing a Single Wire Protocol (or SWP), that allows to communicate with the card 14. The contact interface may contain two contacts used for implementing a USB Inter-Chip (or IC) protocol as defined by ETSI.

The phone 12 is adapted to communicate data with the card 14 by using, for example, Application Protocol Data Unit (or APDU) or Internet Protocol (or IP).

The phone 12 has a first antenna 11, as another I/O interface, to communicate, over-the-air (or OTA), via a long range radiofrequency bi-directional link 15, through a cellular telecommunication network 16, with the mobile network server 18.

The cellular telecommunication network 16 is connected, for example, through a cable, via a bi-directional link 17, to the mobile network server 18. The cellular telecommunication network 16 is adapted to implement a 2G (acronym for a second generation network, i.e. GSM for "Global System for Mobile communications"), 3G (acronym for a third generation network, i.e. UMTS for "Universal Mobile Telephone System") and/or CDMA (acronym for a "Code Division Multiple Access") mode(s).

The phone 12 comprises, as a man machine interface, a keyboard 19 and a display screen 112.

The phone 12 has preferably the capacity to communicate with the mobile network server 18. The mobile network server 18 is integrated within an entity of a system that can be constituted by the system usually known as a back-end OTA system. The mobile network server 18 is directly or indirectly controlled by a mobile network operator (or MNO).

To interact with the card user from and/or through the card 14, the phone 12 has the capacity to implement a mechanism by which the card 14 acts as a master while the phone 12 acts as a slave. As known per se, to implement this mechanism, the phone 12 regularly sends to the card 14 a message that requests to the card 14 whether the card 14 has some command to send to the phone 12. Such a command is termed a proactive command.

The phone 12 is adapted to interpret any proactive command originating from the card 14 involving a user operation, such as "Display text", "Set-up menu", "Select menu", "Get-inkey", and/or "Get-input".

The phone microprocessor is also configured to send back, once a displayed service has been selected, by the card user, among possibly several displayed one(s), to the card 14 another command for launching an execution, by the card 14, of the corresponding selected application.

The selected application is stored or to be stored and is executed or to be executed by the card 14.

As application selected by the user through the phone man machine interface, it can constitute any application supported by the card 14. The selected application may have been previously either loaded during a manufacturing process of the card 14 including its personalization process, such as the SIM application, or downloaded from the mobile network server 18 to the card 14.

As application selected by the user through the phone man machine interface, it can also constitute any application to be supported by the card 14. The selected application may request either a downloading of the selected application, from an application issuer, such as a server, through the phone 12, to the card 14. The server may be connected to the electronic payment terminal 114 (not represented).

As to a bank application, the application issuer can be operated by a bank operator or on its behalf. The issuer of the bank application that delivers the bank application data is termed hereinafter a bank server.

For example, the bank server is connected to the electronic payment terminal 114 and/or the phone 12.

The card 14 is able to receive a command, originating from, for example, the phone 12, for requesting an execution of a processing relating to an application supported or to be supported by the card 14. The command is received from outside and may relate to one selected service among the one(s) that has(have) been displayed, through the phone man machine interface, to the card user.

According to an important feature of the invention, the card 14 is adapted to allow an owner of the card 14, as card user (or termed end user), to control a processing relating to an application supported or to be supported by the card 14.

The card user may approve or refuse an execution of a request for the processing relating to an application supported or to be supported by the card 14.

According to another embodiment (not represented), the card 14 is adapted to allow an owner of the card 14, as card user, to control a processing relating to an application supported or to be supported by at least one of two entities among the card 14 and the phone 12.

As to processing relating to a selected application supported or to be supported by the card 14, it can be a creation of a secure memory area within the card 14 that is dedicated to store an application to be imported from outside the card 14, a downloading of the selected application from a remote server, such as a bank server or the mobile network server 18, to a card memory, a loading of the selected application from the phone 12 to a card memory, a moving of the selected application within a card memory from a card memory space into another card memory space, an installation of the selected application within a card memory, an execution of the selected application by a card microprocessor, a modification of the selected application by a card microprocessor, and/or a deletion of the selected application stored within a card memory.

For example, to perform an electronic transaction (or payment), the card 14 has to support a bank application, so as to use the card 14 in cooperation with the phone 12 as bank transaction (or payment) means. The bank application has to be downloaded to the card 14 from a bank server.

The card 14 may support no application apart from a specific invention application, termed hereinafter self issuer application (or SI), so that only the card user, as the owner of the card 14, controls a management for any application to be supported by the card 14.

To download the bank application data, the bank server, as an application issuer, should firstly send, through the phone 12, to the card 14, a request for creating a secure memory area within the card 14. Once the card user has authorized the creation of a secure memory area within the card 14, the card 14 sends back to the bank server, data, such as an authentication key, for allowing the card 14 to support the bank application. The created secure memory area is a memory space dedicated to the management of any application to be issued by the bank server under the card user control. The created secure memory area is only controlled by the card user.

To download the bank application data, the card user (after selection of a corresponding service originating from a card menu or a card server) sends, through the phone 12, to the card 14, a request for downloading bank application data compliant with the electronic payment terminal 114.

The card 14 has to download the bank application data from the bank server (i.e. a server managed by a bank operator or on its behalf), as a new application issuer, as a processing of an application to be supported by the card 14. Once the bank application data is downloaded, the card user is able to use rights for using, through the electronic payment terminal 114, a bank network to perform a bank transaction.

To cooperate with the electronic payment terminal 114, the phone 12 has a second antenna 111, as still another I/O interface, to communicate, through a short range radiofrequency bi-directional link 113, i.e. up to a distance about 20 centimeters, with the electronic payment terminal 114. The second antenna 111 is used for implementing a contactless technology like a ISO 14 443 and/or a Near Field Communication (or NFC) technology(ies), as known per se.

The electronic payment terminal 114 comprises an antenna 115, in order to communicate, through a short range radiofrequency bi-directional link 113, with the phone 12.

The electronic payment terminal 114 is equipped with a display screen 116 and a keyboard 117. The keyboard 117 can be used to enter an amount value of a product or a service to sell. The display screen 116 can be used to display the amount value relating to a payment to be performed for a product or a service to sell.

The electronic payment terminal 114 is connected to the bank server (not represented) operated by a bank operator or on its behalf (such as through another bank operator).

The electronic payment terminal 114 is used to perform an electronic payment transaction with a card user that owns the card 14, as electronic payment means, as a medium for a chip 110.

Figure 2:
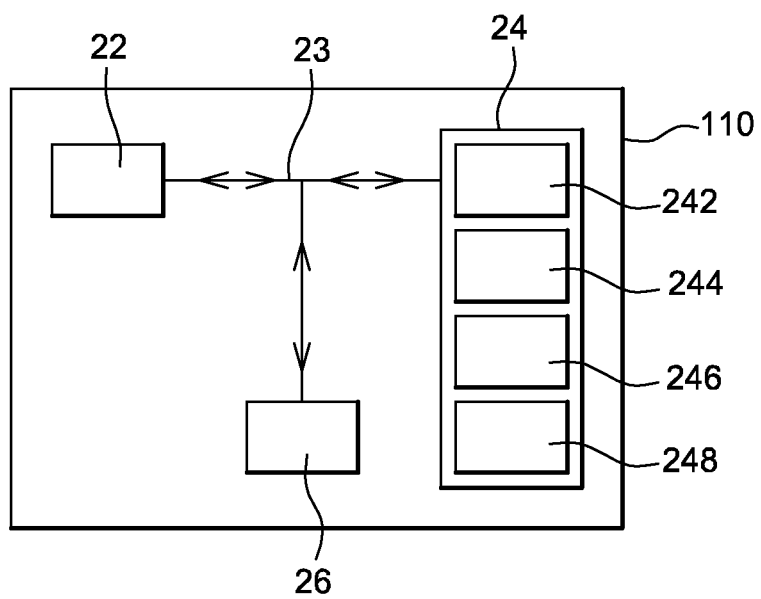
FIG. 2 represents a simplified diagram of an embodiment of the smart card of FIG. 1, as token, intended to be coupled to the mobile telephone, as terminal, of FIG. 1.

The chip 110 is further described in details in relation with the FIG. 2.

The chip 110 communicates with the phone 12, via the bi-directional link 13, through a contact interface of the ISO 7816 type.

According to one embodiment, the contact interface contains one contact pad used for implementing the SWP, to communicate with the phone 12 for accessing one or several applications integrated or to be integrated within a web server of the card 14, also termed hereinafter Smart Card Web server (or SCWS).

According to another embodiment, the contact interface contains one contact pad used for implementing a S2C protocol, to communicate with the phone 12 for accessing one or several applications integrated or to be integrated within a web server of the card 14.

According to the invention, the card 14 supports a specific application, termed hereinafter self-issuer application (or SI). The SI is intended notably to authorize or not a processing of an application supported or to be supported by the card 14 thanks to a control of the card user.

The SI is preferably adapted to use a mechanism by which the card 14 acts as a master while the phone 12 acts as a slave. As known per se, the card 14 sends to the phone 12 a proactive command.

To interact with the card user from the SI, a service offered by the card 14, namely a creation of a secure memory area within the card 14 dedicated to the bank application data to be downloaded from any new application issuer, is accessible, through a SCWS page, with a message for requesting the card user to authorize or not the creation of the secure memory area.

The SCWS page is accessed via a web browser.

The web browser is an application stored and run by the phone 12 (or termed midlet when it is a Java application).

According to a variant, instead of using a card server, a creation of a secure memory area within the card 14 dedicated to the bank application data to be downloaded, as one processing relating to an application to be supported by the card 14, is accessible, through the phone display 112, via a card menu or the like.

According to another embodiment (not represented), instead of being accessible, through a SCWS page, the card user is prompted with a message for requesting the card user to authorize or not a creation of a secure memory area within the card dedicated to the bank application data to be downloaded, through a graphical application supported by the phone 12. Preferably, the graphical application has been previously authenticated by the card, and more exactly the SI. The graphical application is then paired as the card user interface with the SI to be used by the card user to give or not her/his consent for an execution of one processing relating to an application supported or to be supported by the card 14.

The card 14 is inserted within the phone 12.

According to another embodiment, instead of the contact interface, the card 14 and the phone 12 are coupled to each other, through a short range radiofrequency link, as contactless interface, such as a Bluetooth (registered trademark) or a Wifi (registered trademark) link.

Among the proposed applications, there is a bank application to be supported by the chip 110. The bank application allows the chip 110 to operate in cooperation, through the contact pad reserved for SWP and the second antenna 111 of the phone 12, with the electronic payment terminal 114.

According to an alternative, instead of accessing the bank application through the contact pad reserved for SWP, the bank application is accessed via the ISO 7816 contact interface.

According to another alternative, instead of accessing the bank application through the contact pad reserved for SWP, the bank application is accessed via a SigIn-SigOut-Connection (or $S^2C$) interface, as two contacts.

According to a variant, instead of the contact pad reserved for SWP used for communicating through the second antenna 111 of the phone 12 with the electronic payment terminal 114, as a corresponding targeted interlocutor, the card 14 is itself provided with an antenna (not represented).

To interact with the phone 12 so as to involve the card user, the card chip 110 is preferably configured to use a proactive command(s) to be transmitted to the phone 12. Thus, the card chip 110 is able to propose to the card user, on the own authority of the card, through the phone display screen 112, a choice between an authorization or a forbidding of an execution of a processing relating to an application supported or to be supported by the card 14. The corresponding command, as a processing request for the concerned application, is preferably accompanied with the choice between an authorization and a forbidding of an execution of a processing relating to an application supported or to be supported by the card 14.

Preferably, the card chip 110 is able to propose to the card user, on the own authority of the card, through the phone display screen 112, a message for entering data, so as to authenticate the card user. Once the card chip 110 has verified that the card user authenticates, the card chip 110 validates the card user choice.

For each processing request, one or several items can be proposed and selected by the card user in accordance with her/his choice(s) to be given through the phone man machine interface.

The card user can enter data to indicate her/his chosen personal data, in order to personalize the processing relating to the application to be executed.

The card user interacts with the phone man machine interface to authorize or forbid a processing of an application supported or to be supported by the card 14.

Once the bank application data has been downloaded, the card 14 supports the bank application. The card user may access the bank application, through the SCWS, for its execution, after having been authorized by the card user (i.e. by a card user authentication).

The chip 110 allows to identify and authenticate a carrier (or termed subscriber) of the card 14, as card user, before a server (not represented) (distinct from mobile network server).

The card user is allowed to access some service(s) that an operator, or on its behalf (possibly through another operator), proposes, through the mobile network server 18 for a MNO and/or the electronic payment terminal 114 for a bank operator.

Each service is associated with a corresponding application stored within a dedicated secure memory area of the card 14 (at least in part).

FIG. 2 schematically shows components incorporated within the chip 110 of the card 14 intended to interact with the phone 12, as terminal, so that the card user manages by herself/himself one processing(s) relating to an application (s) supported or to be supported by the card 14.

As card 14, it can be a SIM type smart card, such as a SIM smart card for a GSM network, a Universal Subscriber Identity Module (or USIM) for a UMTS network, a Removable User Identity Module (or RUIM) and/or a Code Division Multiple Access (or CDMA) Subscriber Identity module (or CSIM) for a CDMA network. Naturally, the just aforementioned list is not exhaustive.

The chip 110 comprises, as data processing means, one microprocessor 22, volatile and non volatile memories 24 and at least one I/O interface 26 linked together through a data and control internal bus 23.

The I/O interface 26 is used to exchange data with outside of the card 14, namely with at least the phone 12 and the electronic payment terminal 114 through a phone I/O interface.

The microprocessor 22 executes notably any application stored within card memories, and in particular the self-issuer (or SI) application.

The microprocessor 22 controls and communicates with all the components of the card 14, such as the memories to read them and possibly write into them.

The memories 24 can be constituted by one or several EEPROM (acronym for "Electrically Erasable Programmable Read-Only Memory"), one or several ROM (acronym for "Read Only Memory"), one or several Flash memories, and/or any other memories of different types, like one or several RAM (acronym for "Random Access Memory").

According to the invention, the chip 110 is arranged so as to involve the card user by requesting her/him to give her/his authorization before executing one processing relating to an application supported or to be supported by the card 14, and check whether the card user approves or refuses an execution of the considered processing.

The memories 24 comprise several secure memory areas 242, 244 and 246 or termed security domains within the GlobalPlatform specifications relating to a card.

A secure memory area 242 stores data relating to an Operating System (or OS). The OS acts, as an intermediary software entity between outside of the chip 110 and the SI.

As it is explained hereinafter, the memories 24 comprises another secure memory area 246 to be created under the card user control associated with an application issuer, for example a server relating to a bank operator, distinct from an application issuer or a token issuer possibly already registered.

According to the invention, a secure memory area 244 stores data relating to a card user, such as an application specific to the invention, termed Self-Issuer application (or SI), a (on-card) representative of the card user including personal identity information to be entered by the card user herself/himself, an associated user authentication key ku, to authenticate the card user. The chip 110 is adapted to generate the associated authentication key ku upon the basis of the personal identity information entered by the card user during an initialization phase and a predetermined algorithm. As personal identity information, there is a PIN. The predetermined algorithm is used to generate the authentication key and is also stored within the secure memory area 244.

The secure memory area 244 is, specific to the card user. The resulting card 14 becomes an on-card representative of the card user identity.

The on-card user identity is associated with an on-card secure memory area 244.

Such an on-card user identity can be certified by an external entity, as an off-card entity, to connect to the card 14.

According to an alternative, an on-card user identity creation is authorized with a specific authorization number. Such a specific authorization number is generated by a card issuer that issues the card 14. The card issuer thus gives to the card user an authorization for creating or designing her/his own environment.

The generation of an on-card user identity and an authentication of the card user allow the card user to unlock management services associated with the corresponding secure memory area. The card user authentication may be different personal data, such as a login, a password and/or a response(s) to a personal question(s) depending on the configuration of the SI.

For the sake of simplicity, the SI allows the card user to play a role of a token issuer for a processing of an application to be supported by the card 14, such as a creation of a secure memory area 246 dedicated to at least one bank application data to be downloaded. Furthermore, once supported by the card 14, the SI also allows the card user to play a role of an application issuer for a processing of an application supported by the card 14, such as an execution of the bank application and/or a modification of the bank application.

The secure memory area 244 also stores a set of keys to be used for a set of processes for each of a set of applications originating from several application issuers. Each of the set of keys is associated with an authorization number, such as a PIN and/or biometric data, only known and/or specific to the card user. The authorization number is provided by a card issuer, such as Gemalto (registered trademark). One or several keys are to be released by the card 14, so as to authorize the card user before an external entity, such as a remote server, like the bank server, to benefit from the service(s) that it proposes. The concerned key(s) may be an authentication key for authenticating the card user before an application issuer, a key for exchanging data in a confidential manner, and/or a key for encrypting and/or decrypting data. This (these) key(s) may have been either loaded into the secure memory area 244 or downloaded from an external entity, such as a server. The authorization number is known only from the card user and the application issuer.

Optionally, the secure memory area 244 also stores or generates, further to a card user request, at least one pre-authorization number associated with a particular processing relating to an identified application supported or to be supported by the card 14. When the card 14 generates, further to a card user, a pre-authorization number for an execution of a specific command, the card 14 sends the pre-authorization number so as to give her/his authorization to the application issuer. The pre-authorization number is provided by the card 14 to an application issuer, such as a bank operator. The pre-authorization number is used for generating rights for authorizing an execution of a command (or order) for executing a considered processing relating to an application supported or to be supported by the card 14, such as a download of bank application data. Then, when needed, the application issuer may send to the card 14 an authorization number associated with an authorized command or request. In such a case, the authorization number is firstly to be verified by the card 14 before executing a processing of the request or command. To authenticate the card user, the card user is involved by having to enter, through the phone man machine interface, data, as a Personal Identification Number (or PIN), so as to give or not her/his authorization for executing the downloading of the bank application data.

The PIN, as secret data, is known to the sole card user and the card 14.

According to another embodiment (not represented), instead of a PIN, the card user has to enter, through at least one phone interface (not represented), personal biometric data, such as a fingerprint.

According to still another embodiment (not represented), the end user has to enter, through the phone man machine interface, data, as PIN, and, through at least one phone interface (not represented), personal biometric data.

Another secure memory area 248 to be created may store data relating to a mobile network operator, as an application issuer (not already registered), such as the SIM application, the SIM ToolKit application, an International Mobile Subscriber Identity (or IMSI), as a unique number associated with all GSM and UMTS network mobile phone users and an associated authentication key ki. The IMSI is used for identifying a card user, as a subscriber before at least one cellular telecommunication network. The authentication key ki is used for authenticating the card user so as to have rights for using a cellular telecommunication network(s).

When the application issuer delivering the considered application does not have been associated with any secure memory area, a new secure memory area 248 is to be created and associated with a new application issuer under the control of the card user. Thanks to the invention, once the card user gives her/his authorization (by a card user authentication), the SI firstly creates a secure memory area 248 into which the data relating to the SIM application is to be stored. The creation of the new secure memory area results from an allocation of a predefined memory size within the card memories 24 to be used for data originating from the new service provider.

The secure memory area 248 is intended to store data to be downloaded and relating to a SIM application, such as a user identifier and a corresponding authentication key kb. The authentication key kb is used for authenticating the card user so as to have rights for downloading the SIM application and using a cellular telecommunication network.

To check whether the card user approves or refuses an execution of the considered processing, the chip 110 is preferably adapted to compare data entered by the card user with expected data that is stored by (or accessible from) the card 14 (more exactly the secure memory area 244 relating to the card user).

According to the comparison results between the entered data and the expected one, the chip 110 authorizes (when matching) or forbids (when different from each other) to execute the processing relating to the application (supported or) to be supported by the card 14.

When the expected data matches with the entered data, the chip 110 authorizes the processing relating to the application (supported or) to be supported by the card 14 and frees an authentication key specific to the considered processing stored within the secure memory area 244 relating to the card user, for example an authentication key kd for downloading data relating to the bank application.

Figure 3:
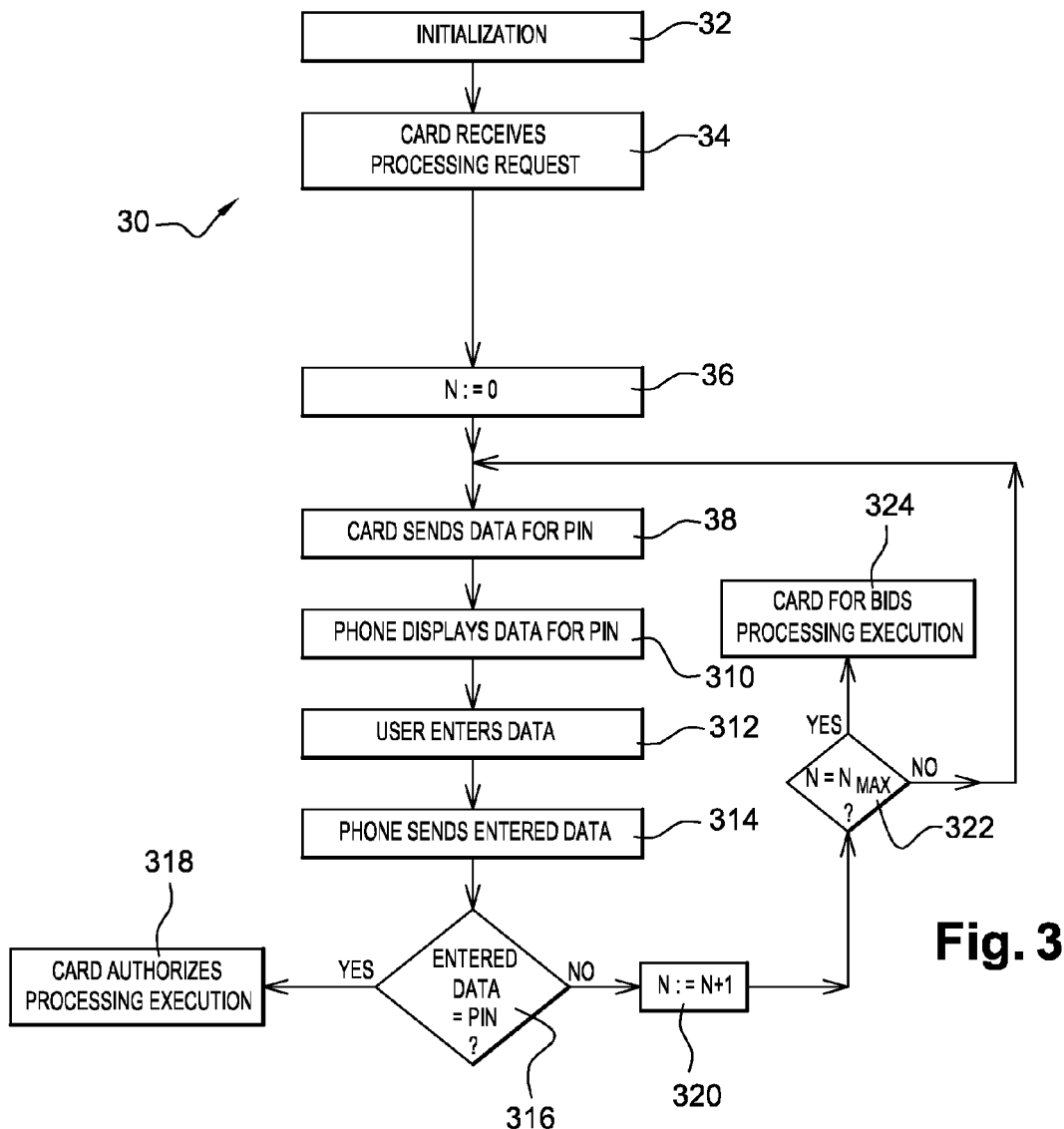
FIG. 3 illustrates a flow chart of an exemplifying method for managing an at least one processing relating to an application to be supported by the smart card of FIG. 2.

FIG. 3 depicts an example of a sequence 30 of steps that is implemented to manage one processing of an application to be supported by the card 14.

It is assumed that a download of data relating to a bank application requires a card user authorisation by using a PIN, as secret data, known to the sole card user and the card 14.

Moreover, it is assumed that the bank application is provided by a new application issuer, i.e. a service provider, distinct from a possible one(s) already registered by the card 14, namely a bank server (operated by a bank operator or on its behalf distinct from a mobile telecommunication operator or on its behalf). The service provider is the one that provides with a corresponding application.

Firstly, during an initialization phase 32, a card user enters personal identity information. The personal identity information preferably comprises an identifier of the card user, such as her/his surname, her/his first name, and other personal data, like a PIN, for authenticating the card user. The identifier of the card user and the PIN are both stored within a secure memory area 244 associated with a SI. The PIN has to be entered by the card user, so as to authorize a considered processing of an application to be supported by the card 14, namely a download of data relating to a bank application. The bank application data is to be downloaded only when authorized by the card user further to an entering of the stored PIN.

Then, the card 14 receives 34 from outside, through the phone I/O interface, a processing request, namely a request for downloading of bank application data into a secure memory area of the card 14. Once the card 14 receives the processing request, the processing request is forwarded to the SI.

Then, a ratification counter relating to a count of attempts for giving a right PIN is initialized 36 to zero.

Optionally, when the card 14 receives (not represented) a pre-authorization number, the pre-authorization number is to be used by the card user before a card user authentication. When the pre-authorization number is typed or entered by the card user, the card 14 sends, to an external entity, such as a remote server, as a possibly new application issuer, rights for authorizing the card 14 to go further by receiving a request for executing a processing relating to at least one application supported or to be supported by the card 14, such as a downloading of the application data to be stored within a created secure memory area.

Then, the card 14 sends 38 to the phone 12 data for requesting the card user to authenticate by giving a PIN, so as to authorize an execution of the corresponding processing, namely a download of bank application data.

The data exchanges between the card 14 (namely the SI) and the phone 12 are encrypted.

The phone 12 can display one HTML page for presenting to the card user a message for informing about a receipt of the processing request, with a description of the processing and an identifier of a corresponding requester. The message can be as follows "Do you authorize to download a bank application?" while presenting two buttons, such as one button "OK" and another button "cancel". The card user has validated the processing request by pushing the "OK" button.

The phone 2 displays 310 another HTML page for presenting a message for prompting the user to enter her/his PIN, such as "please enter your PIN" while also displaying two buttons like "OK" and "CANCEL". Thus, the card user may either validate her/his entered data or cancel her/his entered data without incrementing the count relating to a card user authentication attempt. The card user is thus requested to give her/his consent or authorization for executing the considered processing, namely downloading the bank application data.

The card user enters 312, for example with the phone keyboard 19, data to be considered as PIN, and validates the data she or he has just entered.

Preferably, the data entered by the card user is not intended to appear in a clear form, but in a protected form by a corresponding displayed page. Thus, any other person than the card user, like a potential robber, is not aware of the value of the entered data. When entering data, as PIN, a star (or any other character) can be displayed, such as through the phone display screen, for each entered character, in order to render the entered character non-visible in clear at the phone display screen, to protect the entered data from being stolen.

The phone 12 sends 314 back to the card 14 the entered data for authorizing the corresponding processing request.

Then, the card 14 verifies 316 whether at least one condition is satisfied in order to allow or not to execute a corresponding processing, namely a download of bank application data. More exactly, the card 14 analyses whether the entered data, as PIN, is the expected PIN.

If the answer is yes, i.e. when the entered data corresponds with the expected PIN stored within the card 14, then the card 14 authorizes 318 to execute the requested processing, namely a download of bank application data. When the comparison has been successful, the card 14 uses a previously created secure memory area 246 associated with the application issuer. The card 14 further allows to receive data originating from outside.

The card 14 may send to outside data relating to a result following the requested processing.

To allow the card 14 to receive data, the card 14 sends data to an external entity, such as a server, (possibly as an application issuer) such as one key(s) stored within a secure memory area 244 or generated by the SI and relating to the card user. When the processing request is a request for creating a secure memory area, the key is possibly accompanied with a request for downloading the application data to be stored within the created secure memory area. When the external entity has successfully processed the data originating from the card 14, like a verification of an authentication key, the external entity sends back to the card 14 some required data. The card 14 (more exactly the SI) directs the received data to the created secure memory area 246 associated with the corresponding application issuer to store it.

Optionally, a card content management is carried out only if the associated secure memory area has previously been able to obtain from the SI a signature. The SI generates a corresponding signature based upon the card user authorization to be transmitted to the secure memory area associated with the application issuer, such as a bank server.

If the answer is no, i.e. when the entered data does not correspond with the expected PIN stored within the card 14, then the card 14 increments 320 the ratification counter value with one unity.

Then, the card analyses 322 whether the ratification counter value has reached a predefined maximum value, for example the value "three".

If the ratification counter value is equal to the predefined maximum value, then the card 14 forbids 324 to go further by denying to execute the requested processing, namely a download of bank application data, while possibly sending to the phone 12 a message for informing the card user about a deny of an execution of the requested processing.

On the contrary, i.e. if the ratification counter value is less than the maximum value, then the step 38 is repeated, i.e. the card 14 sends once again to the phone 12 data for requesting the card user to authenticate by giving a further attempt for PIN, so as to authorize or forbid an execution of the processing request, namely a download of bank application data.

Since the card user controls her/his own environment within the chip 110 based upon data only known to her/him and/or personal data only specific to her/him, like biometric data, one and the same card 14 may be owned by several card users, each card user having her/his own environment within the chip 110. For example, one card user uses the card 14 for one application supported by the card 14 while having access to an associated secure memory area thanks to personal authorisation data and another card user uses the same card 14 for the same application (or another application) while having access to another associated secure memory area thanks to other personal authorisation data.

The resulting card 14 allows to obtain a portable electronic medium that is user-friendly since the card 14 lets the card user(s) to control her/his(their) own environment(s) within the chip 110.

The card user(s) has(have) freely the choice to design the card chip environment by giving or not her/his consent before an execution of a corresponding processing (i.e. create a secure memory zone to be associated to a new application issuer, load, download, import, move, modify, add, delete, install, and/or execute an application) relating to an application supported or to be supported by the card 14.

The proposed solution is compliant with GlobalPlatform specifications, such GP 2.2 for a card with a SCWS.

The proposed solution is also compliant with government services, by which a so-termed privacy enhanced technology (or PET) may be required. An update of a card, as token, is authorized by the card user, and the card registers the user consent for future proof. The invention card (or token) is thus able to provide a generic model for capturing and managing one or a plurality of consents of the card user, as end user. In other words, the invention card may store one authorisation for each request that is processed by the card.

Figure 4:
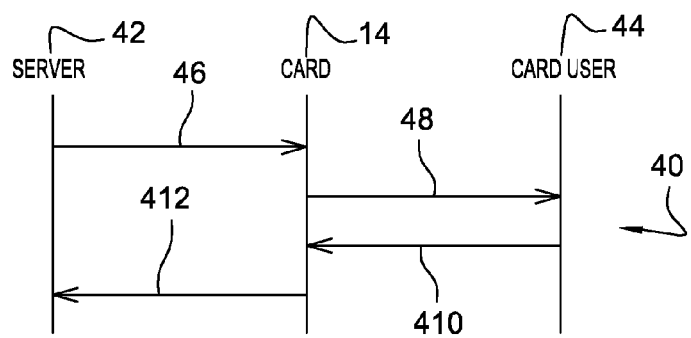
FIG. 4 represents an example of a message flow between a server, the smart card and an end user of the system of FIG. 1.

FIG. 4 depicts an example of a message flow 40 that involves a server 42, the card 14, and a card user 44, as end user.

It is assumed that the card user 44 owns the card 14.

The server 42 sends to the card 14 a request 46 for creating a secure memory area. The secure memory area to be created is dedicated to an application issuer, such as a bank operator or on its behalf. As an application, it is, for example, a bank application to be issued by the bank operator or on its behalf. Once the secure memory area is created within the card 14, the bank application is then to be stored within the created secure memory area.

Once the card 14 receives the request 46, the card 14 triggers a dedicated application, namely the SI, stored within its memories, so as to process the request 46 for creating a secure memory area.

The card 14, more exactly the SI executed by the card 14, receives and interprets the request for creating a secure memory area.

When the card 14 recognizes the request for creating a secure memory area and possibly its sender, the card 14, more exactly the SI executed by the card 14, gives authorization to go further by involving the card user 44 so as to give or not to give her/his authorization before executing a processing of the request for creating a secure memory area.

The card user 44 is able to interact with the card 14, and more exactly the SI executed by the card 14, through a user interface provided, for example, by the phone 12 or the card 14.

To involve the card user 44, the card 14, more exactly the SI executed by the card 14, sends a request 48 for requiring to the card user to give her/his authorization.

The card user 44 receives a message such as "Do you authorize to create a secure memory area to be dedicated to a bank application?" while presenting two buttons, such as one button "OK" and another button "cancel".

The card user 44 validates the processing request by pushing the "OK" button and does give her/his authorization by entering a PIN that is only known to the card user and/or other data for authenticating the card user 44, as a proof of her/his consent for executing a processing of the request for creating a secure memory area. The PIN and/or other data for authenticating the card user 44 is(are) to be checked by the card 14, more exactly the SI executed by the card 14, that stores the PIN and/or other data for authenticating the card user 44.

The card user 44 also defines her/his own rights for using the secure memory area to be created, such as rights for modifying an application to be supported. To define her/his own rights, the card user 44 may tick or not a corresponding box(es) displayed at the phone display screen associated with some text explaining the subject-matter of each of the rights.

Once the card user 44 has entered data, the user interface sends the entered data 410 to the card 14.

To check her/his authorization for executing a processing of the request for creating a secure memory area, the card 14, and more exactly the SI executed by the card 14 includes a verification of a card user authentication.

When the card user 44 has been authenticated as a proof of authorization for executing a processing of the request for creating a secure memory area, the card 14, and more exactly the SI, creates a secure memory area within the card 14.

Then, the card 14, and more exactly the SI executed by the card 14, sends to the server 42 a certificate 412, such as an authentication key, for indicating the server that a secure memory area has been created within the card 14. The certificate is to be verified by the server 12. The certificate can be stored within the card 14 or generated by the card 14 and released as soon as the card user 44 has been effectively authenticated by the card 14 (that executes the SI).

Thanks to the invention, the card user 44 becomes a card issuer as to a management of any application to be supported or supported by the card 14.

The invention claimed is:

1. A method for managing at least one processing relating to an application supported or to be supported by a device, the device including a chip, the chip comprising means for processing data, means for storing data and means for communicating externally of the chip, the chip being coupled to a host device, wherein the method comprises the following steps:
   sending, by the chip, as a master, to the host device, a proactive command for requesting at least one chip user to provide an authorization to create a secure memory area within the chip before executing the at least one processing relating to an application supported or to be supported by the chip;
   verifying, by the chip, whether the at least one chip user has provided an authorization; and
   authorizing, by the chip, only if the at least one chip user provides an authorization, a creation of a secure memory area within the chip, the secure memory area being included within the means for storing data.

2. The method according to claim 1, wherein, before a first step of sending a proactive command for requesting at least one chip user to provide an authorization to create a secure memory area within the chip before executing the at least one processing relating to an application supported or to be supported by the chip, the chip generates data to send externally, the data being relative to a pre-authorization number, the data being used to generate rights for authorizing the chip to process a request for executing the at least one processing relating to an application supported or to be supported by the chip.

3. The method according to claim 1, wherein, to provide an authorization of the chip user, the at least one chip user enters a password, such as a Personal Identification Number, or personal biometric data, so as to authenticate the at least one chip user.

4. The method according to claim 1, wherein the at least one processing relating to the application supported or to be supported comprises at least one element belonging to a group comprising:
   a downloading of the application into the created secure memory area;
   a loading of the application into the created secure memory area;
   a moving of the application within the created secure memory area;
   an installation of the application within the created secure memory area;
   an execution of the application by the means for processing data;
   a modification of the application by the means for processing data;
   a deletion of the application within the created secure memory area.

5. The method according to claim 1, wherein, before the first step of sending a proactive command for requesting at least one chip user to provide an authorization to create a secure memory area within the chip, the at least one chip user enters an authorization number based upon data originating from a chip issuer, the chip issuer issuing the chip.

6. The method according to claim 1, wherein the chip supports a self-issuer application, the self-issuer application generates a signature based upon the chip user authorization and sends the generated signature to the secure memory area to be created.

7. The method according to claim 1, wherein the first step of sending a proactive command for requesting at least one chip user to provide an authorization to create a secure memory area within the chip before executing the at least one processing relating to an application supported or to be supported by the chip, is carried out through a page relating to a web server embedded within the chip.

8. The method according to claim 1, wherein, the host device is a terminal with which the chip cooperates, and the first step of sending a proactive command for requesting at least one chip user to provide an authorization to create a secure memory area within the chip before executing the at least one processing relating to an application supported or to be supported by the chip, is carried out through a graphical application supported by the terminal, the graphical application being authenticated by the chip.

9. The method according to claim 1, wherein, before the first step of sending a proactive command for requesting at least one chip user to provide an authorization to create a secure memory area within the chip before executing the at least one processing relating to an application to be supported by the chip, the chip receives data originating externally, the data originating externally comprising a request for creating one secure memory area of the chip under one and the same control of the at least one chip user, a secure memory area of the chip being created under one and the same control of the at least one chip user and associated with an application issuer, the application issuer issuing the application to be supported by the chip.

10. A device for managing at least one processing relating to an application supported or to be supported by the device, the device including a chip, the chip being coupled to a host device, the chip comprising:
   means for processing data;
   means for storing data; and means for communicating externally of the chip, wherein the means for processing data is configured to (i) function as a master and send a proactive command to the host device for requesting at least one chip user to provide an authorization to create a secure memory area within the chip before executing the at least one processing relating to an application supported or to be supported by the chip, (ii) verify whether the at least one chip user provides an authorization; and (iii) authorize, if the at least one chip user provides an authorization, an execution of a creation of a secure memory area within the chip, the secure memory area being included within the means for storing data.

11. The device according to claim 10, wherein the secure memory area is dedicated to store an application to be imported from outside the chip.

12. The device according to claim 10, wherein the device is included within at least one element of a group comprising:

a smart card;
a SIM type card;
a USB type dongle;
a MMC card;
a SD card; and
an embedded secure element.

13. The device according to claim 10, wherein the host device is included within at least one element of a group comprising:

a mobile telephone;
a set-up box;
a desktop computer;
a laptop computer;
a media player;
a game console;
a handset;
a Personal Digital Assistant.

* * * * *